(No Model.)

J. PETERSON.
HARNESS ATTACHMENT.

No. 416,945. Patented Dec. 10, 1889.

Witnesses:
E. C. Wurdeman,
W. T. Tyrall

Inventor
James Peterson,
By his Attorneys

UNITED STATES PATENT OFFICE.

JAMES PETERSON, OF OSKALOOSA, KANSAS.

HARNESS ATTACHMENT.

SPECIFICATION forming part of Letters Patent No. 416,945, dated December 10, 1889.

Application filed May 4, 1889. Serial No. 309,573. (No model.)

*To all whom it may concern:*

Be it known that I, JAMES PETERSON, a citizen of the United States, residing at Oskaloosa, in the county of Jefferson and State of Kansas, have invented a new and useful Harness Attachment, of which the following is a specification.

This invention has relation to a harness attachment designed to prevent the horse from engaging his tail with the reins, whereby the driving of fractious animals is rendered dangerous.

Among the objects in view are to provide a neat and tasty arrangement of straps which, while thoroughly guarding the reins against being caught by the animal's tail, will yet permit a free and easy use of the same, which is readily adjustable for different-sized horses, and can be readily removed and replaced.

Other objects of the invention hereinafter appear, and the novel features thereof will be particularly pointed out in the claims.

Figure 1:
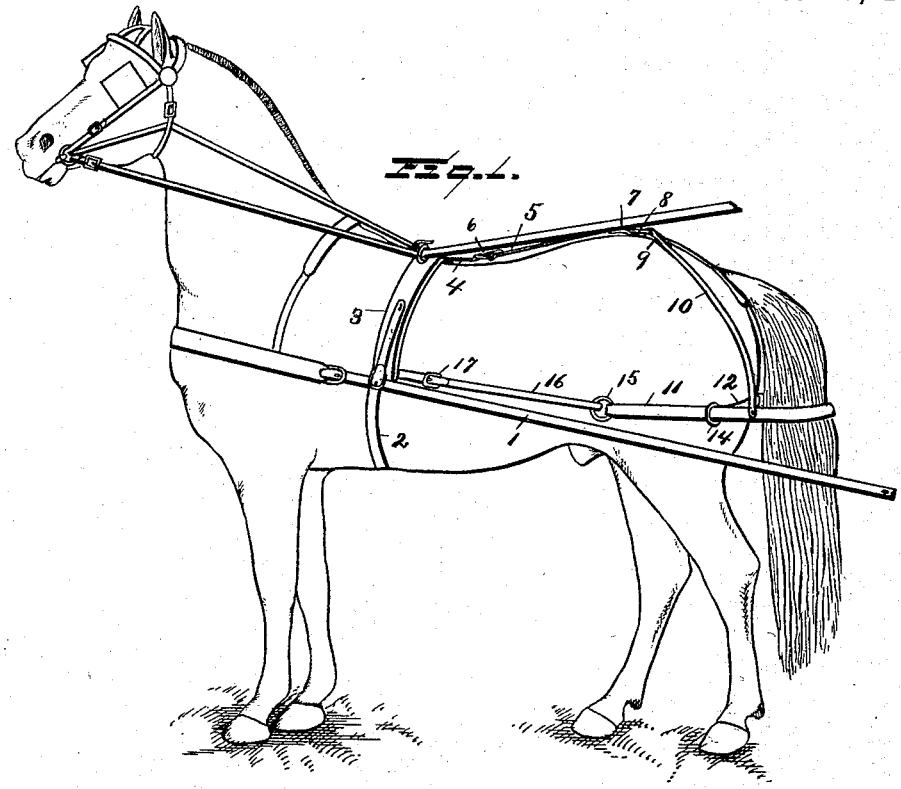
Figure 2:
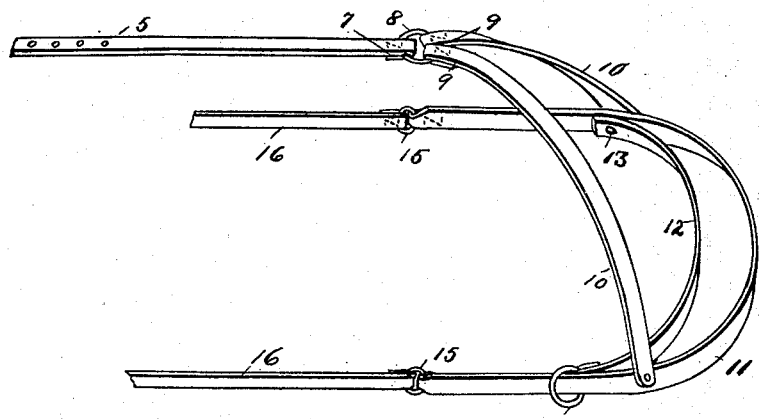

Referring to the drawings, Figure 1 represents a horse provided with a rein-guard constructed in accordance with my invention. Fig. 2 is a detail in perspective of the guard detached.

Like numerals of reference indicate like parts in all the figures of the drawings.

1 represents the tugs or traces, 2 the belly-band, 3 the saddle, and 4 the back-strap, of a harness of the usual construction.

5 represents the back-strap of my attachment. The same is provided with holes whereby the strap is adapted to be connected to the buckle 6 of the saddle 3, and by which means, also, the strap 5 may be adjusted, so as to adapt the attachment for bodies of different length. At the rear end of the back-strap 5 is formed a loop 7, which is connected with a ring 8. Similar loops 9 are formed in opposite side straps 10, the loops of which are connected to the ring 8, and from the same the side straps depend and diverge.

Connected to the terminals of the depending opposite straps 10, and adapted to embrace the tail of the animal, is a rear strap 11, secured to which, upon its inner surface, is a second strap 12, the latter passing around the inside of the tail and connected to the strap 11 securely at one end by means of a rivet 13, which also secures the terminal of the strap 10 to said strap 11. The opposite end of the strap 12 is provided with a ring 14, through which the strap 11 loosely runs.

At the forward ends of the strap 11, which extends around to the sides of the horse, are connected, by means of rings 15, side straps 16, the forward ends of which are provided with buckles 17, designed to receive the terminals of said straps after the same has passed around the intersection of the belly-band, back-band, and tug. If desired, these straps may be extended so as to connect with any part of the harness.

By reason of the tail-receiving loop formed by the two straps 11 and 12, and the manner in which they are loosely connected, it is evident that the tail of the animal may be readily inserted, and that the straps will automatically adjust themselves to the side thereof. The straps 11 12, being arranged substantially parallel and separated by a space, form a tail-receiving loop, which is arranged horizontal and allows a lateral swing of the tail, but prevents a vertical movement.

If desired, the strap 5 may be attached in any other manner or to any other part of the harness. So, also, may the forward ends of the side straps 16 be otherwise connected to the saddle, and also to any other part of the harness. In fact, I do not limit myself to these minor details, as the essential feature of my invention resides in the arrangement of the straps 11 and 12.

Having described my invention and its operation, what I claim is—

1. The herein-described attachment for harness, consisting of a back-strap 5, terminating in oppositely-arranged side straps 10, to which is connected strap 11, to which is secured the strap 12, said straps 11 12 being curved and arranged in the same horizontal plane and forming a horizontal tail-receiving loop in the space between them, the said strap 11 being connected to the side straps 16, as set forth.

2. The combination, with the harness, of the back-strap 5, having openings at its forward end to connect by the buckle 6 with the saddle 3 and provided at its rear end with the ring 8, the side straps 10, diverging from the ring, the rear strap 11, connected with the diverging straps, and the side straps 16, connected with the terminals of the rear strap and provided with a buckle 17, and the strap 12, having one end loosely connected with the strap 11, substantially as specified.

3. The herein-described attachment, consisting of the back-strap 5, having openings near its front end and connected with the ring 8, the side straps 10, diverging from the ring, the rear strap 11, connected with one of the side straps, as at 13, and provided with the small strap 12, connected thereto at the same point and having a ring at its opposite end to receive the strap 11, and the side straps 16, provided with buckles 17, substantially as specified.

4. The herein-described attachment to harness, comprising the horizontal curved straps 11 12, separated by a space forming an elongated horizontal tail-receiving loop, which clasps the inner and outer sides of the tail and allows a lateral swing of the tail, but prohibits any vertical movement, said straps being connected together, and means, substantially as described, for connecting them to the harness of the horse, as set forth.

5. The herein-described attachment to harness, comprising the curved horizontal straps 11 12, separated by a space forming a tail-receiving loop, which clasps the inner and outer sides of the tail and allows a lateral swing of the tail, but prohibits any vertical movement, the strap 12 being connected rigidly to strap 11 at one end and having a ring 14 at the other end to slide over the strap 11, both straps 11 12 being suitably connected to the harness.

In testimony that I claim the foregoing as my own I have hereto affixed my signature in presence of two witnesses.

JAMES PETERSON.

Witnesses:
W. A. HAMILTON,
G. W. LOWMAN.